United States Patent
Adelman

(10) Patent No.: US 10,624,426 B2
(45) Date of Patent: Apr. 21, 2020

(54) SYSTEMS AND METHODS FOR A SECURE CARABINEER KEY RING

(71) Applicant: Nite Ize, Inc., Boulder, CO (US)

(72) Inventor: Gregory M. Adelman, Boulder, CO (US)

(73) Assignee: Nite Ize, Inc., Boulder, CO (US)

(*) Notice: Subject to any disclaimer, the term of this patent is extended or adjusted under 35 U.S.C. 154(b) by 213 days.

(21) Appl. No.: 14/776,256

(22) PCT Filed: Mar. 14, 2014

(86) PCT No.: PCT/US2014/028456
§ 371 (c)(1),
(2) Date: Sep. 14, 2015

(87) PCT Pub. No.: WO2014/152969
PCT Pub. Date: Sep. 25, 2014

(65) Prior Publication Data
US 2016/0037869 A1    Feb. 11, 2016

Related U.S. Application Data

(60) Provisional application No. 61/784,271, filed on Mar. 14, 2013.

(51) Int. Cl.
*A44B 15/00* (2006.01)
*F16B 2/22* (2006.01)
*F16B 45/02* (2006.01)

(52) U.S. Cl.
CPC ............ *A44B 15/002* (2013.01); *A44B 15/00* (2013.01); *F16B 2/22* (2013.01); *F16B 45/02* (2013.01)

(58) Field of Classification Search
CPC ......... A44B 15/002; A44B 15/00; F16B 2/22; F16B 45/02; Y10T 24/4465
See application file for complete search history.

(56) References Cited

U.S. PATENT DOCUMENTS 504,039 A * 8/1893 Kempshall .............. F16B 45/02
                                                          24/601.4
874,647 A    12/1907 Wlatnigg
(Continued)

FOREIGN PATENT DOCUMENTS

| CH | 609542 A5 | 3/1979 |
|---|---|---|
| CN | 202774508 U | 3/2013 |

(Continued)

OTHER PUBLICATIONS

European Search Report dated Oct. 4, 2016 issued in parallel European App. No. 14770309.4-1705 (9 pages).
(Continued)

*Primary Examiner* — Victor D Batson
*Assistant Examiner* — Matthew J Sullivan
(74) *Attorney, Agent, or Firm* — Haynes and Boone, LLP

(57) ABSTRACT

A key ring includes a body having an upper ring and a lower ring, the upper ring having a closable opening. The upper ring and the lower ring are separated by a pinch point. The pinch point includes a first and second side of the body, the first and second sides of the body in very close proximity at the pinch point, such that a key sliding along the lower ring of the body may not easily pass the pinch point to the upper ring.

14 Claims, 4 Drawing Sheets

(56) References Cited

U.S. PATENT DOCUMENTS

| | | | | |
|---|---|---|---|---|
| 1,206,074 | A | * | 11/1916 | Zweiner ............... A44B 15/002 224/666 |
| 1,333,655 | A | * | 3/1920 | Davis ................... A44B 15/00 70/458 |
| 1,428,678 | A | * | 9/1922 | Buchsbaum ........... A44B 15/00 24/574.1 |
| 1,974,856 | A | | 9/1934 | White et al. |
| 2,135,771 | A | * | 11/1938 | Roof ....................... F16B 45/02 24/601.3 |
| 4,287,736 | A | | 9/1981 | Hadgis |
| 5,187,844 | A | | 2/1993 | Simond |
| 5,915,946 | A | | 6/1999 | Nakajima |
| D444,685 | S | | 7/2001 | Shenkel et al. |
| D466,791 | S | * | 12/2002 | Kelleghan ....................... D8/356 |
| 7,331,087 | B2 | * | 2/2008 | Lindsay ............. A44B 18/0015 24/442 |
| D592,939 | S | * | 5/2009 | Kelleghan ....................... D8/356 |
| 7,621,026 | B2 | * | 11/2009 | Lindsay ............. A44B 18/0015 24/442 |
| D608,184 | S | * | 1/2010 | Kelleghan ....................... D8/356 |
| D639,046 | S | | 6/2011 | Ormsbee et al. |
| D757,513 | S | * | 5/2016 | Heins ............................... D8/40 |
| 2002/0169435 | A1 | * | 11/2002 | Neeb ................. A61F 13/15658 604/385.101 |
| 2011/0138587 | A1 | | 6/2011 | Walker et al. |
| 2014/0274614 | A1 | * | 9/2014 | Newman ............ A63B 21/4035 482/139 |
| 2015/0068258 | A1 | * | 3/2015 | Jiang ...................... A44B 15/00 70/456 R |
| 2015/0156905 | A1 | * | 6/2015 | Blochlinger ............ F16F 1/027 206/736 |
| 2016/0255918 | A1 | * | 9/2016 | Grossman .............. A44B 15/00 |

FOREIGN PATENT DOCUMENTS

| | | | |
|---|---|---|---|
| DE | 413694 A | 1/1924 | |
| DE | 3543870 A1 | 6/1986 | |
| DE | 4327340 A1 | 2/1995 | |
| DE | 9321185 U1 * | 8/1996 | ............. A44B 15/00 |
| GB | 1065231 A | 4/1967 | |
| JP | 2008-232154 | 10/2008 | |
| WO | WO9628988 A1 | 9/1996 | |

OTHER PUBLICATIONS

Office Action dated Aug. 6, 2016 issued in parallel Chinese App. No. 201480027017.4 (15 pages with English translations).

International Search Report in related PCT Application No. PCT/US14/28456 dated Oct. 28, 2014 (4 pages).

Office Action dated Sep. 26, 2017 issued in related European App. No. 14770309.4 (6 pages).

Office Action and Search Report dated Jan. 4, 2018 issued in related Chinese App. No. 2014800270174 (9 pages with English translation).

Office Action dated Feb. 1, 2018 issued in related Japanese App. No. 2016-502794 (8 pages with English translation).

Office Action dated Jun. 8, 2017 issued in parallel Chinese App. No. 201480027017.4 (11 pages with English translations).

* cited by examiner

SYSTEMS AND METHODS FOR A SECURE CARABINEER KEY RING

CROSS-REFERENCE TO RELATED APPLICATIONS

This application is a National Stage of PCT Application No. PCT/US2014/028456 filed on Mar. 14, 2014, which PCT application claims the benefit of U.S. Provisional Application No. 61/784,271 filed Mar. 14, 2013. The above PCT and provisional patent applications are hereby incorporated by reference to the same extent as though fully contained herein.

BACKGROUND

Rings for holding keys find ubiquitous use. The ability to add keys to a key ring while providing a secure holding system is of prime importance. Additionally, it is desirable at times to join one or more key rings together or attach the key ring to a secure holding area.

SUMMARY

In one embodiment, a secure carabineer key ring is provided that may be easily attached to items and provides the user the ability to quickly add and secure keys. Additionally, there is no danger of the keys sliding off when the carabineer is in use, as compared to the simple use of a carabineer. In contrast to a double carabineer or other similar item that uses one area to hold keys and another separate area for attaching to items, manufacturing costs and complexity are reduced, since only a single gate is needed.

In one embodiment, a key ring includes a body having an upper ring and a lower ring, the upper ring having a closable opening. The upper ring and the lower ring are separated by a pinch point. The pinch point includes a first and second side of the body, the first and second sides of the body in very close proximity at the pinch point, such that a key sliding along the lower ring of the body may not easily pass the pinch point to the upper ring. Optionally, the closable opening includes a carabineer gate. In one alternative, the body is a thin piece of material with a rectangular cross section. Optionally, the body is a thin piece of material with a circular cross section. In another alternative, the body is flexible, and the first side of the body is adapted to be flexed away from the second side of the body such that a key sliding along the lower ring of the body may easily pass the pinch point to the upper ring. Optionally, the body is a single piece of material. Alternatively, the body is a unitary piece of material. In one configuration, the upper ring and the lower ring are continuous, such that an item oriented around the body of the upper ring traverses to the body of the lower ring.

In one embodiment, a method of using a key ring includes providing a key ring having an upper ring and a lower ring, a pinch point separating the upper and lower rings, the upper ring having a closable opening. The method further includes opening the closable opening and sliding a key on the upper ring. The method further includes closing the closable opening and flexing a body of the key ring such that the pinch point allows the key to slide from the upper ring to the lower ring. The method further includes releasing the body such that the pinch point closes. Optionally, the method includes flexing a body of the key ring such that the pinch point allows the key to slide from the lower ring to the upper ring; sliding the key from the lower ring to the upper ring; releasing the body such that the pinch point closes; opening the closable opening; sliding a key off the upper ring; and closing the closable opening. In one alternative, the closable opening includes a carabineer gate. Optionally, the upper and lower rings are made of a thin piece of material with a rectangular cross section. In another alternative, the upper and lower rings are made of a thin piece of material with a circular cross section.

In another embodiment, a key ring includes a body having an carbineer section and a slot section, the carabineer section having a closable opening, wherein the pinch point includes a first and second side of the body, the first and second sides of the body in very close proximity at the pinch point, such that a key sliding along the lower ring of the body may not easily pass the pinch point. Optionally, the first side of the body is an approximately tubular section and the second side of the body is a plate-like section. Alternatively, the pinch point is adjacent to the closable opening. In one alternative, the pinch point is on an opposite side of the body from the closable opening. Optionally, the carabineer section and the slot section are continuous and the carabineer section and the slot section separated by a pinch point. In another alternative, the carabineer section and the slot section are non-continuous. Optionally, the body is a single piece of material.

DETAILED DESCRIPTION OF THE DRAWINGS

Described herein are embodiments of a secure carabineer key ring and methods of using it and making it.

Figure 1:
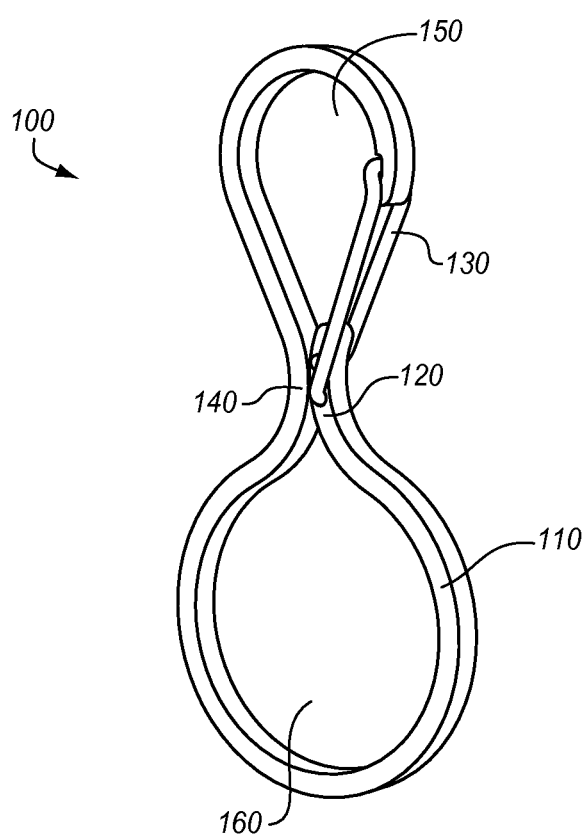
FIG. 1 shows one embodiment of a secure carabineer key ring.

FIG. 1 shows one embodiment of a secure carabineer key ring. The primary aspects of the carabineer key ring are shown. Carabineer key ring 100 includes a carabineer body 110 that may be composed of metal, plastic, nylon, or other similar materials. Carabineer key ring 100 includes a carabineer gate attachment point 120 and a carabineer gate 130. Although a metal wire gate is shown, any of the variety of gates may be used as will be apparent to those of ordinary skill in the art in light of this disclosure. Secure carabineer key ring 100 further includes pinch point 140, upper ring 150, and lower ring 160. The upper ring 150 and the lower ring 160 can be of any shape or size. In the embodiment shown, the upper ring 150 is smaller and the lower ring is rounder and larger in order to effectively hold keys placed on it. The upper ring 150 and lower ring 160 are shown as formed from a single piece of material. This may be advantageous in many configurations, since it provides for a better flex at pinch point 140 as compared to a device made of multiple pieces.

Pinch point 140 provides a separation between the upper and lower rings 150, 160. In use, the user may place keys on the upper ring 150 by opening carabineer gate 130. The user then may slide the keys into a more secure position on lower ring 160 by flexing the body of secure carabineer key ring 100 to create a separation between the sides of the pinch point 140. The flexing may be accomplished by pulling on the body of the secure carabineer key ring 100 or wedging a key towards the pinch point 140. In this second case, the key itself will act like a wedge and separate the sides of the body at the pinch point 140. By releasing the sides of the body at the pinch point 140, the key is secured in the lower ring 160.

The resulting configuration provides a very secure holder for keys, while at the same time allowing for ease of insertion and removal of the keys. In operation, when the user attaches the secure carabineer key ring 100 to another object using the carabineer portion, keys in the lower ring 160 are very unlikely to pass pinch point 140 unless the user desires them to do so. When the gate 120 is closed, even if through handling a key makes it pass pinch point 140 into the upper ring 150, the gate will hold it securely on the secure carabineer key ring 100. Therefore, the pinch point should pinch together tightly; however, not so tightly that it will be extremely difficult for a user to pass a key through pinch point 140. In contrast to other types of key rings, pinch point 140 need not be extremely tight to ensure that keys will not escape under usage, since the carabineer portion will also hold the key on the upper ring 150. Typically, with other key rings, if a pinch point is used, the pinch point is either secure and provides great difficulty removing keys or is not secure and keys may be removed easily.

The secure carabineer key ring secures the keys by first passing through the carabineer gate then through the spring-loaded pinch point. The spring-loaded pinch point is a function of the shape and material (which may be spring steel). Other materials with similar mechanical properties could be used including other metals and plastics.

It is both easy to put keys on and take them off of the secure carabineer key ring while simultaneously being very secure. Most key chains are either one or the other. If they are very secure, they are very difficult to put keys on and take them off. The secure carabineer key ring may be optimal for keys with large plastic heads which can be difficult to put on split rings.

Figure 2:
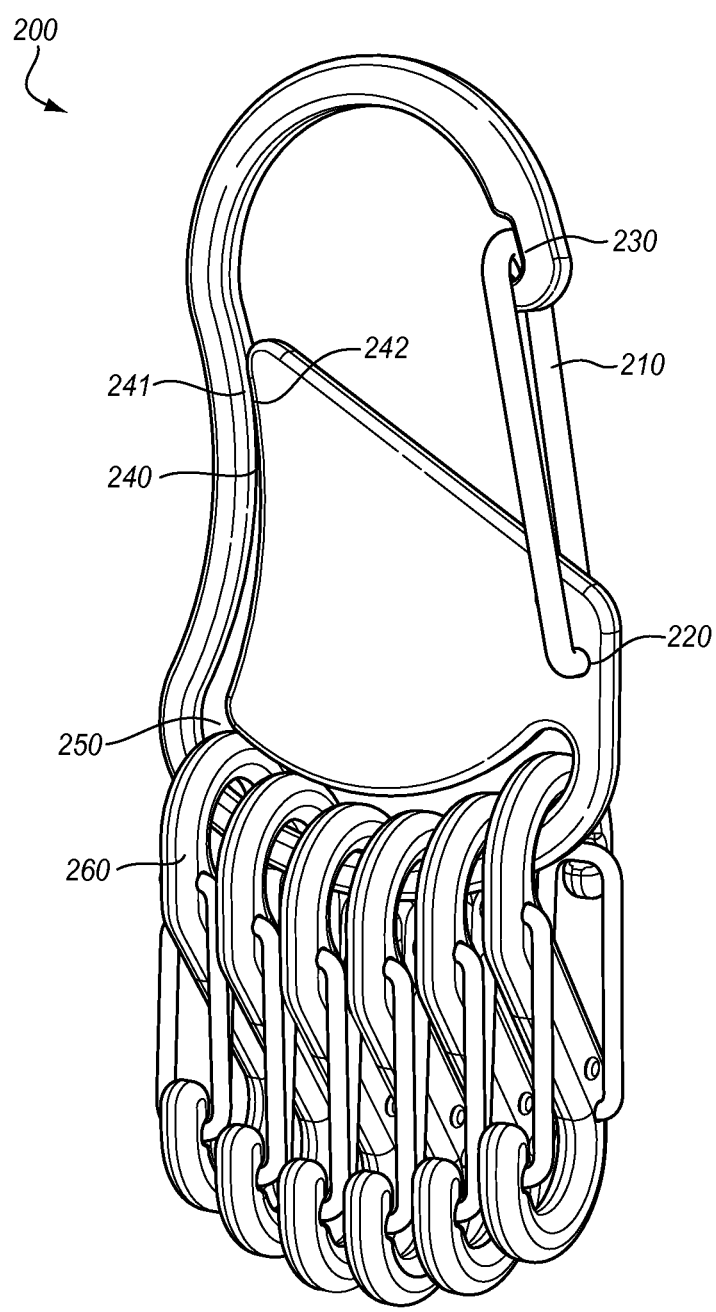
FIG. 2 shows another embodiment of a secure carabineer key ring.

FIG. 2 shows another embodiment of a secure carabineer key ring. In this embodiment, key ring 200 includes a gate 210 having an attachment point 220 and a hook 230 for receiving gate 210. Keys or other items having a receiving hole may be slide along the body of key ring 200, first over hook 230 and then towards pinch point 240. At pinch point 240 the body of the device on either side of pinch point 240 may flex to provide for the key or other item to pass through and past body portions 241, 242. In this version body 242 is a plate like portion and body portion 241 is a somewhat rounded tube like section. The key or other item may come to rest in slot 250. Other items such as double carabineers 260 may also be attached to slot 250 as shown.

Figure 3:
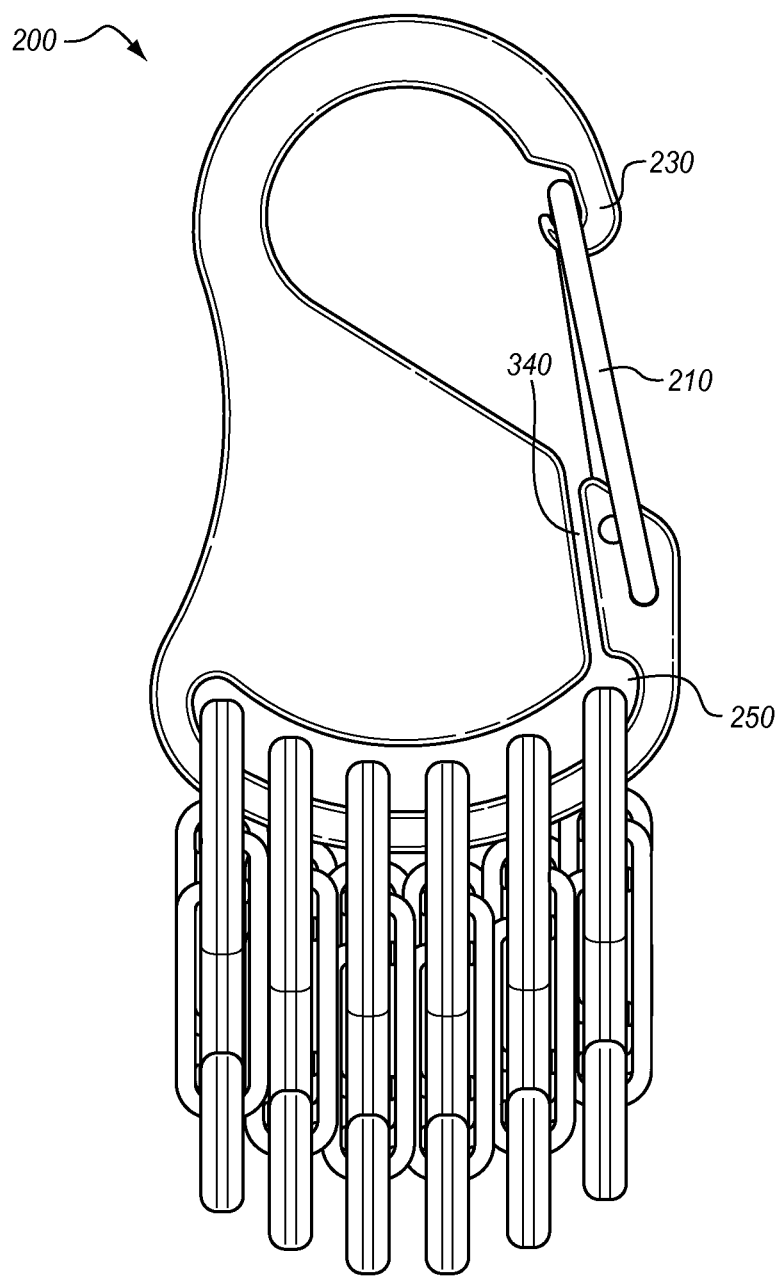
FIG. 3 shows another embodiment of a secure carabineer key ring.

FIG. 3 shows another embodiment of a secure carabineer key ring. In this embodiment, key ring 200 includes a gate 210 having an attachment point 220 and a hook 230 for receiving gate 210. Keys or other items having a receiving hole may be slide along gate 210 towards pinch point 340. The key or other item may come to rest in slot 250. This embodiment is similar to that of FIG. 2, differing in the placement of pinch point 340.

Figure 4:
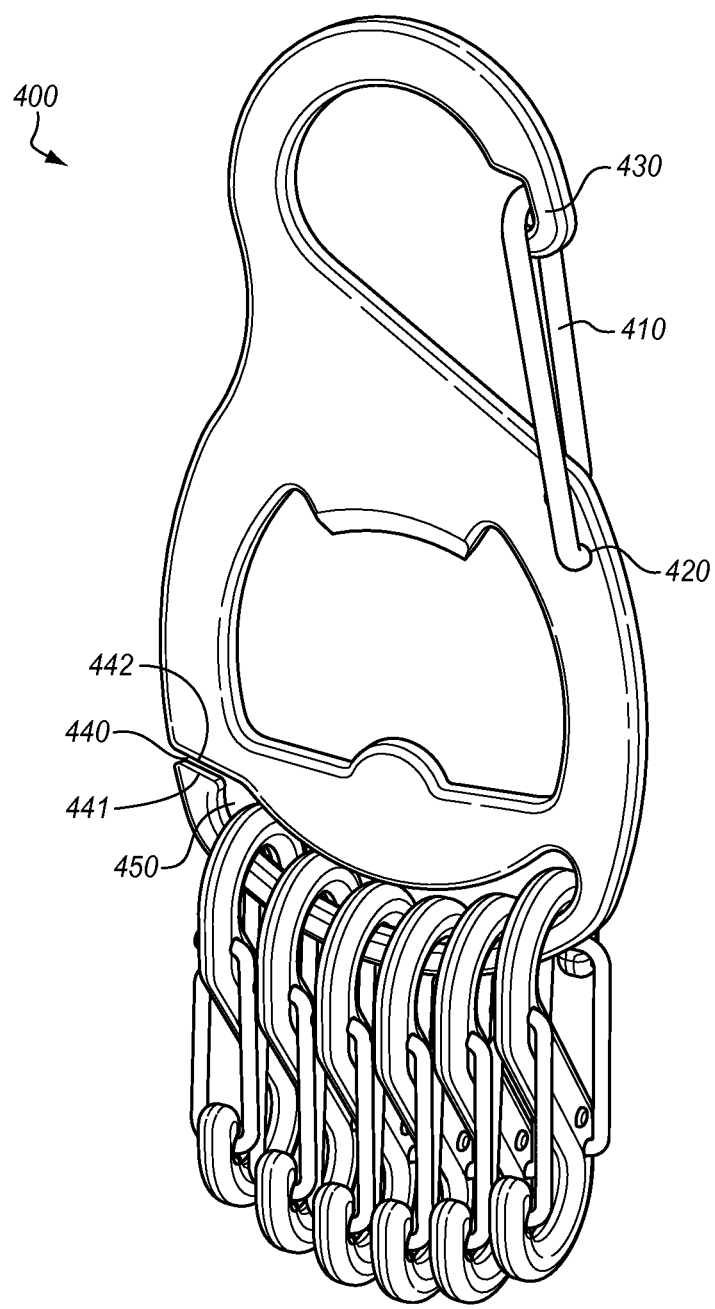
FIG. 4 shows another embodiment of a secure carabineer key ring.

FIG. 4 shows another embodiment of a secure carabineer key ring. In this embodiment, key ring 400 includes a gate 410 having an attachment point 420 and a hook 430 for receiving gate 410. In this embodiment, the pinch point 440 is not part of the main carabineer section. Instead, pinch point 440 occurs in a non-continuous location relative to the carbineer portion. The body, 441, 442 on either side of flex point 440, flexes to allow for keys or other items to exit slot 450. Multiple alternative locations exist for pinch point 440 and all of the pinch points shown in all of the embodiments show. For instance, pinch point 440 may occur as part of the bottle opener portion in FIG. 4. In alternative embodiments, there may be multiple pinch points and carabineer portions on either side of the pinch points providing for a central area for keys or other items and carabineer portions on either end. This would essentially double the carabineer portions show in FIG. 1, so one carabineer portion was on either side of the key retaining area, with a pinch point separating the key retaining area from each carbineer portion. The carabineer portions need not be inline with each other and may be perpendicular or have any other arrangement.

The previous detailed description is of a small number of embodiments for implementing the systems and methods for creating secure carabineer key rings and the systems of secure carabineer key rings and is not intended to be limiting in scope. The following claims set forth a number of the embodiments of the systems and methods for creating secure carabineer key rings and the systems of secure carabineer key rings disclosed with greater particularity.

The invention claimed is:

1. A key ring comprising:
a body having an upper ring and a lower ring, the upper ring having a hook and a closable opening, the upper ring and the lower ring separated by a pinch point, and
a carabiner gate pivotably coupled to the body at an attachment point, the carabiner gate pivoting about an axis defined by the attachment point to selectively engage the hook to selectively close the closable opening, the carabiner date defined by a wire gate,
wherein the pinch point includes a first and second side of the body, the first and second sides of the body together at the pinch point, such that a key sliding along the lower ring of the body flexes the body to pass the pinch point to the upper ring, wherein the body is flexible, and the first side of the body is adapted to be flexed away from the second side of the body such that the key sliding along the lower ring of the body passes the pinch point to the upper ring when the body is flexed, and wherein a portion of the hook extends at least partially through the wire gate to close the closable opening.

2. The key ring of claim 1, wherein the body is a thin piece of material with a rectangular cross section.

3. The key ring of claim 1, wherein the body is a thin piece of material with a circular cross section.

4. The key ring of claim 1, wherein the body is a single piece of material.

5. The key ring of claim 1, wherein the body is a unitary piece of material.

6. The key ring of claim 1, wherein the carabiner gate defines a closed loop through which the hook extends to close the closable opening.

7. The key ring of claim 6, wherein the carabiner gate extends from opposing third and fourth sides of the body.

8. The key ring of claim 1, wherein the pinch point is defined by first and second body portions, the first body portion defined by a plate-like portion, the second body portion defined by a rounded tube-like portion.

9. The key ring of claim 1, wherein the carabiner gate is pivotably coupled to the body proximate to the pinch point.

10. The key ring of claim 1, wherein the carabiner gate is pivotably coupled to the upper ring of the body.

11. A key ring comprising:
a flexible body having an upper ring and a lower ring, the upper ring having a closable opening, the upper ring and the lower ring separated by a pinch point defined by first and second sides of the body, the first and second sides of the body together at the pinch point, such that a key sliding along the lower ring of the body passes the pinch point to the upper ring when the first side of the body is flexed away from the second side of the body; and a carabiner gate pivotably coupled to the body to selectively close the closable opening, wherein the carabiner gate is pivotably coupled to a first portion of the upper ring and selectively engages a second portion of the upper ring to selectively close the closable opening; and wherein the carabiner gate is defined by a wire gate; and the body includes a hook receiving the wire gate, such that a portion of the hook extends at least partially though the wire gate to close the closable opening.

12. The key ring of claim 11, wherein the carabiner gate pivots about an axis defined by one or more attachment points between the carabiner gate and the body.

13. The key ring of claim 11, wherein the carabiner gate pivots within the upper ring.

14. A key ring comprising:

a flexible body having an upper ring and a lower ring, the upper ring having a closable opening, the upper ring and the lower ring separated by a pinch point defined by first and second sides of the body, the first and second sides of the body together at the pinch point; and a carabiner gate pivotably coupled to the body to selectively close the closable opening, the carabiner gate defined by a wire gate, wherein the carabiner gate is pivotably coupled to a first portion of the upper ring and selectively engages a second portion of the upper ring to selectively close the closable opening, and wherein the body includes a hook receiving the wire gate, such that a portion of the hook extends at least partially through the wire gate to close the closable opening.

\* \* \* \* \*